(12) United States Patent
Bao

(10) Patent No.: US 12,301,517 B2
(45) Date of Patent: *May 13, 2025

(54) METHOD FOR CONTROLLING ACTIVATION OF BWP, USER EQUIPMENT AND BASE STATION

(71) Applicant: VIVO MOBILE COMMUNICATION CO., LTD., Guangdong (CN)

(72) Inventor: Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,206

(22) Filed: Feb. 21, 2024

(65) Prior Publication Data

US 2024/0195595 A1 Jun. 13, 2024

Related U.S. Application Data

(63) Continuation of application No. 17/525,925, filed on Nov. 14, 2021, now Pat. No. 11,943,175, which is a (Continued)

(30) Foreign Application Priority Data

Aug. 11, 2017 (CN) .......................... 201710687870.4

(51) Int. Cl.
*H04L 5/00* (2006.01)
*H04W 36/00* (2009.01)
*H04W 36/08* (2009.01)

(52) U.S. Cl.
CPC .......... *H04L 5/0098* (2013.01); *H04L 5/0092* (2013.01); *H04W 36/0072* (2013.01); *H04W 36/08* (2013.01)

(58) Field of Classification Search
CPC ... H04L 5/0053; H04L 5/0092; H04L 5/0098; H04W 36/0072; H04W 36/08;
(Continued)

(56) References Cited

U.S. PATENT DOCUMENTS

2013/0021926 A1  1/2013  Gierhofer et al.
2013/0028182 A1  1/2013  Gierhofer et al.
(Continued)

FOREIGN PATENT DOCUMENTS

CN  101615984 A  12/2009
CN  103051645 A  4/2013
(Continued)

OTHER PUBLICATIONS

Chinese office Action dated Jan. 7, 2020 as received in application No. 201710687870.4.
(Continued)

*Primary Examiner* — Khoa Huynh
(74) *Attorney, Agent, or Firm* — BROOKS KUSHMAN P.C.

(57) ABSTRACT

A method for controlling activation of a bandwidth part (BWP), a user equipment, and a base station are provided. The method includes: receiving BWP configuration information transmitted by a base station; wherein the BWP configuration information is used to indicate a default BWP corresponding to each component carrier. After receiving the BWP configuration information transmitted by the base station, the method further comprises: receiving a component carrier deactivation signaling transmitted by the base station; and deactivating, based on the component carrier deactivation signaling, a third target component carrier, or a third target component carrier and all activated BWPs on the third target component carrier.

20 Claims, 5 Drawing Sheets

Related U.S. Application Data continuation of application No. 16/638,108, filed as application No. PCT/CN2018/098001 on Aug. 1, 2018, now Pat. No. 11,212,064.

(58) Field of Classification Search
CPC .............. H04W 72/04; H04W 72/042; H04W 72/0453; H04W 72/23
See application file for complete search history.

(56) References Cited

U.S. PATENT DOCUMENTS

| | | | |
|---|---|---|---|
| 2013/0114436 A1 | 5/2013 | Dural et al. | |
| 2015/0036645 A1 | 2/2015 | Shin et al. | |
| 2016/0050647 A1 | 2/2016 | Hwang et al. | |
| 2017/0135105 A1 | 5/2017 | Li et al. | |
| 2019/0045549 A1* | 2/2019 | Wu | H04W 74/0833 |
| 2019/0373667 A1* | 12/2019 | Jeon | H04L 5/001 |
| 2020/0245395 A1* | 7/2020 | Zhang | H04W 76/19 |

FOREIGN PATENT DOCUMENTS

| | | |
|---|---|---|
| CN | 104054385 A | 9/2014 |
| CN | 104348525 A | 2/2015 |
| CN | 105099634 A | 11/2015 |
| CN | 106100713 A | 11/2016 |
| EP | 3563489 A1 | 11/2019 |
| EP | 3665849 A1 | 6/2020 |
| WO | 2014163302 A1 | 10/2014 |
| WO | 2018121621 A1 | 7/2018 |
| WO | 2019033017 A1 | 2/2019 |

OTHER PUBLICATIONS

"Further Details on Wider Bandwidth Operations in NR," 3GPP TSG RAN WG1 NR Ad-Hoc#2, R1-17010796, Jun. 27, 2017, MediaTek Inc.

European Search Report dated Jul. 6, 2020 as received in application No. 18845117.3.

"Bandwidth part based resource scheduling for carrier aggregation," 3GPP TSG RAN WG1 NR Ad-Hoc#2, R1-1710171, Jun. 30, 2017, Guangdong OPPO Mobile Telecom.

International Search Report and Written Opinion dated Feb. 20, 2020 as received in application No. PCT/CN2018/098001.

"Further Details on Bandwidth Part Operation in NR," 3GPP TSG RAN WG1 Meeting #90, R1-17013978, Aug. 21, 2017, MediaTek Inc.

Non-Final Office action dated Mar. 29, 2021 as received in U.S. Appl. No. 16/638,108.

Chinese Search Report dated Apr. 24, 2019 as received in application No. 201710687870.4.

"Bandwidth parts configuration and operations," 3GPP TSG RAN WG1 Meeting #89 R1-1707420, May 15, 2017, Intel Corp.

"Open issues for wider bandwidth operations," 3GPP TSG RAN WG1 NR Ad-Hoc#2 R1-1710583, Jun. 27, 2017, Intel Corp.

"On Default Bandwidth Part," 3GPP TSG-RAN WG1 NR Ad-Hoc#2, R1-1710787, Jun. 27, 2017, Panasonic.

European Office Action dated Mar. 29, 2022 as received in application No. 18845117.3.

* cited by examiner

METHOD FOR CONTROLLING ACTIVATION OF BWP, USER EQUIPMENT AND BASE STATION

CROSS-REFERENCE TO RELATED APPLICATIONS

This application is a continuation of U.S. patent application Ser. No. 17/525,925 filed on Nov. 14, 2021, which is a continuation application of U.S. patent application Ser. No. 16/638,108 filed on Feb. 10, 2020, now U.S. Pat. No. 11,212,064, issued on Dec. 28, 2021, which is the U.S. national phase of PCT Application No. PCT/CN2018/098001 filed on Aug. 1, 2018, which claims a priority to Chinese Patent Application No. 201710687870.4 filed on Aug. 11, 2017, which are incorporated herein by reference in their entireties.

TECHNICAL FIELD

The present disclosure relates to the technical field of communications, and in particular to a method for controlling activation of a BWP, a user equipment and a base station.

BACKGROUND

In the $5^{th}$ Generation (5G) wireless communication system using a new radio access (NR) technique, a cell supports a maximum system bandwidth of 400 MHz, which is much higher than a maximum LTE system bandwidth of 20 MHz, so as to support a larger system and user throughput. However, it may be a huge challenge for an implementation of a user equipment (UE) to support such a high system bandwidth, which is not conducive to the implementation of low-cost UEs. Therefore, the 5G NR system also supports dynamic and flexible bandwidth allocation, where the system bandwidth is divided into multiple bandwidth parts (BWPs) to support accesses of narrowband user terminals or user terminals in an energy-saving mode. In the related art, all BWPs supported by a UE are generally activated. Since the UE can support multiple BWPs, the power consumption of the UE may increase, if all the BWPs are simultaneously activated. Therefore, how to flexibly control activated states of multiple BWPs for a UE becomes a technical problem that needs to be solved urgently.

SUMMARY

In a first aspect, an embodiment of the present disclosure provides a method for controlling activation of a bandwidth part (BWP), including:
  receiving and saving BWP configuration information transmitted by a base station, where the BWP configuration information includes BWP identification information;
  receiving a BWP activation command transmitted by the base station; and
  performing BWP activation with a BWP identifier indicated by the BWP activation command.

In a second aspect, an embodiment of the present disclosure further provides a method for controlling activation of a bandwidth part (BWP), including:
  transmitting BWP configuration information to a user equipment, where the BWP configuration information includes BWP identification information; and
  transmitting a BWP activation command to the user equipment, where the BWP activation command is configured for the user equipment to perform BWP activation with a BWP identifier indicated by the BWP activation command.

In a third aspect, an embodiment of the present disclosure further provides a user equipment, including:
  a configuration reception module, configured to receive and save BWP configuration information transmitted by a base station, where the BWP configuration information includes BWP identification information;
  a command reception module, configured to receive a BWP activation command transmitted by the base station; and
  a processing module, configured to perform BWP activation with a BWP identifier indicated by the BWP activation command.

In a fourth aspect, an embodiment of the present disclosure further provides a base station, including:
  a configuration transmission module, configured to transmit BWP configuration information to a user equipment, where the BWP configuration information includes BWP identification information; and
  a command transmission module, configured to transmit a BWP activation command to the user equipment, where the BWP activation command is configured for the user equipment to perform BWP activation with a BWP identifier indicated by the BWP activation command.

In a fifth aspect, an embodiment of the present disclosure further provides an electronic device, including:
  one or more processors;
  a memory; and
  one or more programs, where the one or more programs are stored in the memory and configured to be executed by the one or more processors, and the one or more programs are executed to implement steps in the method for controlling activation of a bandwidth part (BWP) as described in the above first aspect.

In a sixth aspect, an embodiment of the present disclosure further provides an electronic device, including:
  one or more processors;
  a memory; and
  one or more programs, where the one or more programs are stored in the memory and configured to be executed by the one or more processors, and the one or more programs are executed to implement steps in the method for controlling activation of a bandwidth part (BWP) as described in the above second aspect.

In a seventh aspect, an embodiment of the present disclosure further provides a computer-readable storage medium, on which a program is stored. The program is executed by a processor to implement steps in the method for controlling activation of a bandwidth part (BWP) as described in the above first aspect and/or in the second aspect.

BRIEF DESCRIPTION OF THE DRAWINGS

In order to describe technical solutions of embodiments of the present disclosure more clearly, drawings used in the description of the embodiments of the present disclosure are briefly illustrated below. Obviously, the drawings in the following description are just some embodiments of the present disclosure. For those of ordinary skill in the art, other drawings can be obtained based on these drawings without creative effort.

DETAILED DESCRIPTION

Technical solutions in embodiments of the present disclosure will be clearly and completely described below with reference to the accompanying drawings in the embodiments of the present disclosure. Obviously, the described embodiments are part of the embodiments of the present disclosure, but not all of the embodiments. Based on the embodiments in the present disclosure, many other embodiments obtained by a person of ordinary skill in the art without creative efforts shall fall within the protection scope of the present disclosure.

Figure 1:
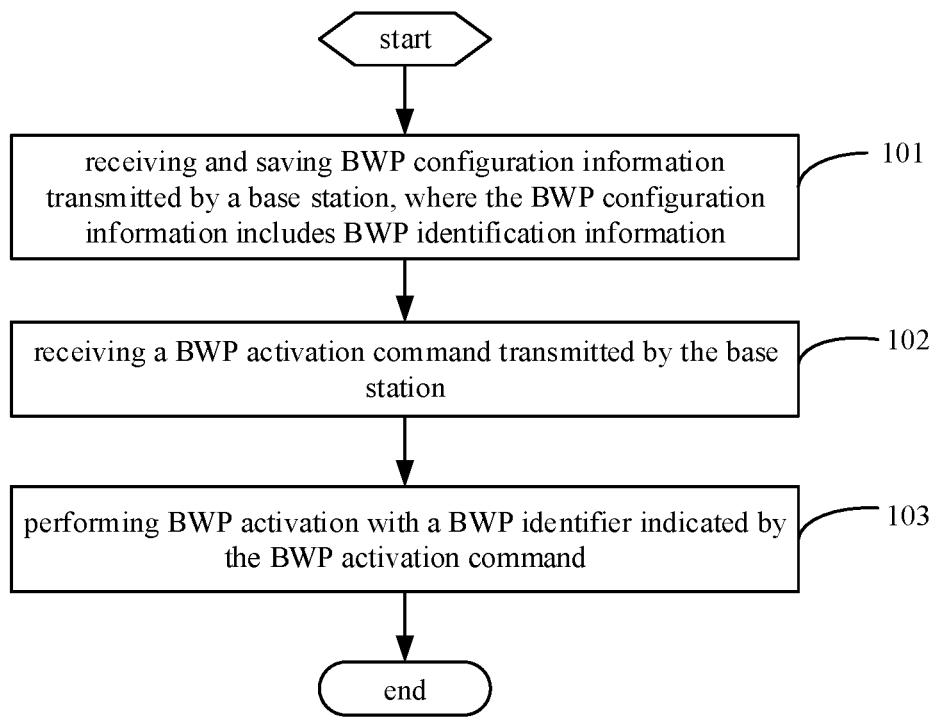
FIG. 1 is a second flowchart of a method for controlling activation of a BWP according to an embodiment of the present disclosure.

Reference is made to FIG. 1, which is a flowchart of a method for controlling activation of a bandwidth part (BWP) according to an embodiment of the present disclosure. As shown in FIG. 1, the method includes the following steps 101 to 103.

Step 101 includes: receiving and saving BWP configuration information transmitted by a base station, where the BWP configuration information includes BWP identification information.

The method for controlling activation of a BWP provided by embodiments of the present disclosure is applied in a user equipment (UE) to manage an activated state of BWP(s) corresponding to each component carrier.

In this step, the base station first configures a BWP for a UE to access the base station. When configuring the BWP, the base station transmits the BWP configuration information to the UE, and the UE may receive and save the BWP configuration information, i.e., saving a correspondence between each component carrier and a default BWP. Specifically, in a practical application, each component carrier is configured with a BWP set, and information about one or more BWPs is stored in the BWP set, that is, one component carrier may correspond to one or more BWPs. In an embodiment, every BWPs may be numbered.

The BWP identification information may be configured to a UE in an explicit or implicit manner.

The explicit manner includes that a dedicated information bit string is configured in the configuration information for each BWP to indicate index information of the BWP.

The implicit manner includes that a serial number of each BWP in a BWP list of the configuration information is an index of the BWP. As an example, the first BWP in the list is numbered as 0, and BWPs subsequent to the first BWP are respectively numbered as 1, 2, 3, and so on.

Step 102 includes: receiving a BWP activation command transmitted by the base station.

The base station may transmit a BWP activation command to the base station through Layer 1 (L1) signaling or Layer 2 (L2) signaling, and the BWP activation command may indicate index information of to-be-activated BWP(s) in an explicit or implicit manner.

The explicit manner includes: carrying index information of a target and to-be-activated BWP in an activation signaling.

The implicit manner includes: carrying a bitmap in an activation signaling, each bit corresponding to one BWP, indicating to activate the BWP when the corresponding bit takes a first value; and indicating to deactivate the BWP when the corresponding bit takes a second value. A position where each indication bit is located in the bitmap corresponds to an index of a corresponding BWP. As an example, the first bit in the bitmap corresponds to a BWP numbered as 0, the second bit in the bitmap corresponds to a BWP numbered as 1, and so on. In a case that a BWP is in an activated state, no operation is performed when a bit corresponding to the BWP in the received activation signaling takes a first value. Similarly, in a case that a BWP is in a deactivated state, no operation is performed when a bit corresponding to the BWP in the received activation signaling takes a second value.

Step 103 includes: performing BWP activation with a BWP identifier indicated by the BWP activation command.

Upon receipt of the BWP activation command, a UE may perform BWP activation with the BWP identifier indicated by the BWP activation command, thereby implementing a control of BWP activation.

Thus, in the embodiment of the present disclosure, BWP configuration information transmitted by a base station is received and saved, and the BWP configuration information includes BWP identification information; a BWP activation command transmitted by the base station is received; and a BWP is activated based on a BWP identifier indicated by the BWP activation command. BWPs are numbered, the activation command indicates a BWP that needs to be activated, and the BWP is activated by a UE, thereby improving the flexibility of BWP activation control.

Figure 2:
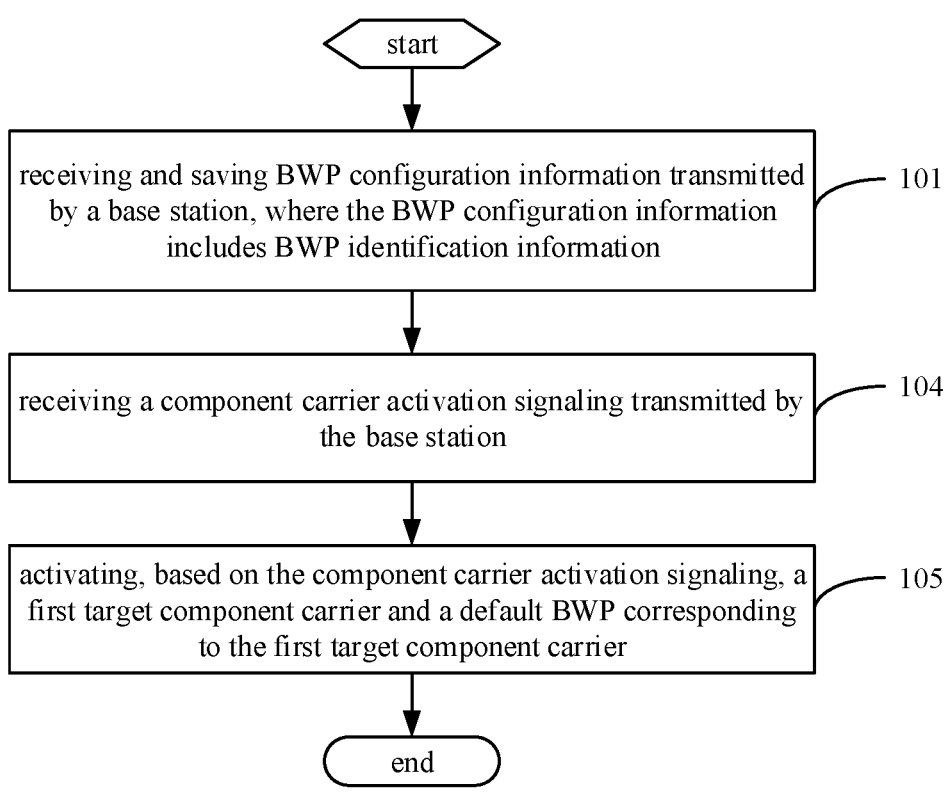
FIG. 2 is a second flowchart of a method for controlling activation of a BWP according to an embodiment of the present disclosure.

Reference is further made to FIG. 2, and the above-mentioned BWP configuration information is used to indicate a default BWP corresponding to each component carrier. Subsequent to step 101, the method further includes:

step 104, receiving a component carrier activation signaling transmitted by the base station; and step 105, activating, based on the component carrier activation signaling, a first target component carrier and a default BWP corresponding to the first target component carrier.

In a case that a component carrier is activated, data can be normally transmitted and received on the component carrier only when there is an activated BWP on the component carrier. The above-mentioned default BWP refers to a BWP that needs to be activated by default, if a command indicates to activate a component carrier, but the command does not specify a BWP on the component carrier requiring to be activated. The number of the default BWP corresponding to each component carrier may be set according to actual needs, and may be one or more, which is not specifically limited herein.

It should be appreciated that when a target component carrier is in a deactivated state, all BWPs on this component carrier are in a deactivated state. In this step, the base station may transmit a component carrier activation signaling to the base station by a control element (CE) of a medium access control (MAC) layer. The component carrier activation signaling carries a first target component carrier that needs to be activated, and all BWPs on the first target component carrier are in a deactivated state.

After receiving the component carrier activation signaling, the UE obtains the first target component carrier that needs to be activated, which is indicated by the component carrier activation signaling, then obtains a default BWP corresponding to the first target component carrier according to the previously stored BWP configuration information, and finally activates the first target component carrier and the default BWP(s) corresponding to the first target component carrier.

In this embodiment, a default BWP corresponding to each component carrier is configured in BWP configuration information, and then a first target component carrier and a default BWP corresponding to a first target component carrier are directly activated based on the component carrier activation signaling. Therefore, an activated state of the component carrier and an activated state of a BWP on the component carrier can be controlled through a single signaling, thereby reducing signaling overhead. In addition, since a single signaling is used to simultaneously activate a component carrier and activate a BWP on the component carrier, a transmission delay can be avoided, which is caused by controlling an activated state of the component carrier and an activated state of the BWP on the component carrier through separate signalings.

It should be appreciated that a manner where a base station configures BWP configuration information for indicating a default BWP corresponding to each component carrier can be set according to actual needs. For example, in an embodiment, the configuring manner can be implemented in any of the following manners:
- a first manner including that, for a component carrier configured with a BWP set, one bit is used to indicate whether each BWP in the BWP set is the default BWP;
- a second manner including that, for a component carrier configured with a BWP set, a BWP ranked first or last in the BWP set is the default BWP;
- a third manner including that, for a component carrier configured with a BWP set, each BWP has an index value, and a BWP with an initial index value in the BWP set is the default BWP; for example, if the BWP identifier value in a BWP set starts from 0, a BWP with the index value 0 is determined as a default BWP;
- a fourth manner including that, for a component carrier configured with a BWP set, a BWP with the widest or narrowest bandwidth in BWPs in the BWP set is the default BWP; or
- a fifth manner including that, for a component carrier configured with a BWP set, a BWP with the lowest or highest starting frequency in BWPs in the BWP set is the default BWP.

Figure 3:
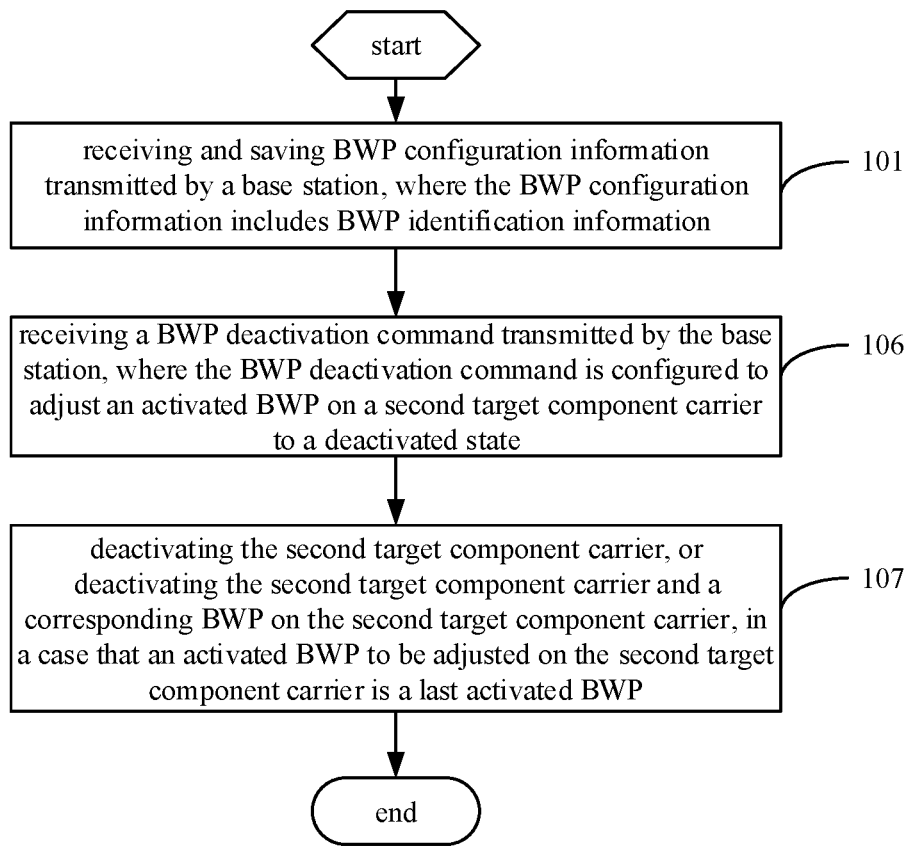
FIG. 3 is a third flowchart of a method for controlling activation of a BWP according to an embodiment of the present disclosure.

Further, after the base station transmits the BWP configuration information, the activated BWP may be deactivated based on signaling. Specifically, referring to FIG. 3, subsequent to the above step 101, the method further includes steps 106 and 107.

Step 106 includes: receiving a BWP deactivation command transmitted by the base station, where the BWP deactivation command is configured to adjust an activated BWP on a second target component carrier to a deactivated state.

In this step, the base station may transmit a BWP deactivation command to a UE through L1 or L2 signaling. The signaling may include an identification indication of a BWP that needs to be deactivated. The UE may obtain the second target component carrier where the BWP needs to be deactivated is located, by inquiring the previously saved BWP configuration information.

Step 107 includes: deactivating the second target component carrier, or deactivating the second target component carrier and a corresponding BWP on the second target component carrier, in a case that an activated BWP to be adjusted on the second target component carrier is a last activated BWP.

In this step, when an deactivation operation is performed on a BWP on the second target component carrier, in a case that there are multiple activated BWPs on the second target component carrier, a BWP specified in the BWP deactivation command may be directly deactivated; and in a case that only the last activated BWP exists on the second target component carrier, the second target component carrier may be deactivated, or both the second target component carrier and a corresponding BWP (that is, a BWP specified in the deactivation command) on the second target component carrier. In addition, in a case that a BWP specified in the BWP deactivation command includes all activated BWPs on the second target component carrier, which also means performing a deactivation on the last activated BWP on the second target component carrier, the second target component carrier may be deactivated in this case, or both the second target component carrier and a corresponding BWP on the second target component carrier (that is, a BWP specified in the deactivation command) may be deactivated in this case. Since the deactivation of a component carrier can be achieved by only indicating a BWP deactivation during a deactivation process, the signaling overhead is further reduced.

Figure 4:
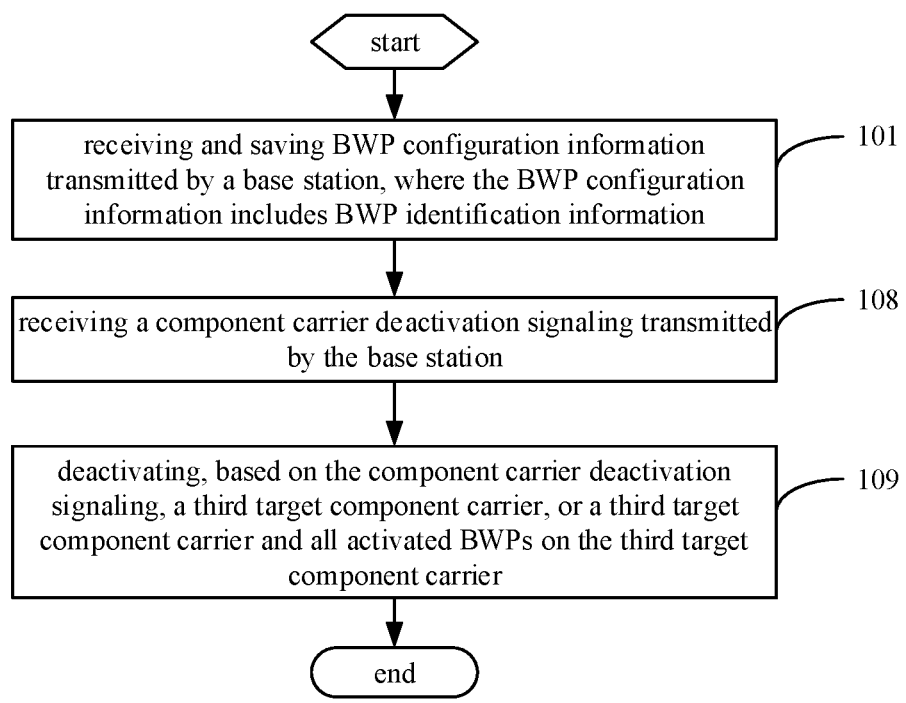
FIG. 4 is a fourth flowchart of a method for controlling activation of a BWP according to an embodiment of the present disclosure.

Further, after the base station transmits the BWP configuration information, the activated BWP may be deactivated in accordance with a signaling. Specifically, referring to FIG. 4, subsequent to the above step 101, the method further includes steps 108 and 109.

Step 108 includes: receiving a component carrier deactivation signaling transmitted by the base station.

In this step, the base station may transmit a component carrier deactivation signaling to a UE through a control element of a medium access control layer (MAC CE). The component carrier deactivation signaling includes a third target component carrier that needs to be deactivated. The UE may obtain all BWPs on the third target component carrier based on the previously saved BWP configuration information. The third target component carrier may include one or more BWPs in an activated state, and may also include one or more BWPs in a deactivated state.

Step 109 includes: deactivating, based on the component carrier deactivation signaling, a third target component carrier, or a third target component carrier and all activated BWPs on the third target component carrier.

In this step, upon receiving the component carrier deactivation signaling, a UE may deactivate the third target component carrier, or may deactivate the third target component carrier and all the activated BWPs on the third target component carrier. Since the deactivation of a BWP can be achieved only based on a component carrier deactivation signaling, the signaling overhead is further reduced.

Further, the BWP activation command is configured to adjust a deactivated BWP on a fourth target component carrier to an activated state. The performing BWP activation with the BWP identifier indicated by the BWP activation command includes: activating the fourth target component carrier and a BWP designated to be activated through the BWP activation command, in a case that the fourth target component carrier is in a deactivated state.

In an embodiment, the base station may transmit a BWP activation command to a UE through L1 signaling or L2 signaling, and the BWP activation command includes a BWP that needs to be activated. The UE may obtain the fourth target component carrier corresponding to the BWP(s) that needs to be activated by inquiring the previously saved BWP configuration information.

The UE determines whether the fourth target component carrier is in an activated state, may directly activate a BWP designated to be activated through the BWP activation command if the fourth target component carrier is currently in an activated state, and may activate the fourth target component carrier and a BWP designated to be activated through the BWP activation command if the fourth target component carrier is currently in a deactivated state. In this embodiment, a component carrier can be controlled to be activated only through a BWP activation command, thereby further reducing the signaling overhead.

It should be noted that in the related art, a UE usually accesses to only one base station, and of course, a UE can also access to two base stations, where one of the base stations is a primary base station and the other one is a secondary base station. In an embodiment, the foregoing BWP configuration information may include BWP configuration information of the primary base station and BWP configuration information of the secondary base station. In a case that a secondary base station needs to be added to the UE, the primary base station configures BWP configuration information of the secondary base station for the UE. In this case, when the UE receives the BWP configuration information of the secondary base station, the BWP configuration information of the secondary base station is used to indicate a component carrier where a primary cell of the secondary base station is located, and default BWP information corresponding to each component carrier. Subsequent to the above step 101, the above method further includes: actively activating, by the UE, a default BWP corresponding to the component carrier where the primary cell in the secondary base station is located.

In this embodiment, after receiving the BWP configuration information of the secondary base station, the UE may activate the default BWP corresponding to the component carrier where the primary cell in the secondary base station is located in accordance with indications, thereby implementing data transmission to the secondary base station. It should be understood that for processes of activating and deactivating a BWP corresponding to a component carrier where a secondary cell in the secondary base station is located and a non-default BWP corresponding to a component carrier where a primary cell in the secondary base station is located, reference can be made to the foregoing embodiments, and details are not described herein again.

Further, the base station may further perform handover on the primary cell. Specifically, subsequent to the above step 101, the method further includes:
receiving a primary cell handover command transmitted by the base station, where the primary cell handover command is configured to indicate a target primary cell as a handover cell and a default BWP on the target primary cell; and
performing a cell handover based on the default BWP on the target primary cell and the target primary cell, for example, performing a random access procedure on the default BWP of the target primary cell.

In this embodiment, a base station can control a UE to be switched to a target primary cell through a primary cell handover command, so as to supply a better service to the UE. In order to enable normal data transmission on the target primary cell, a default BWP on the target primary cell is indicated in the primary cell handover command. Therefore, the UE can complete the subsequent target cell handover procedure on the default BWP.

Figure 5:
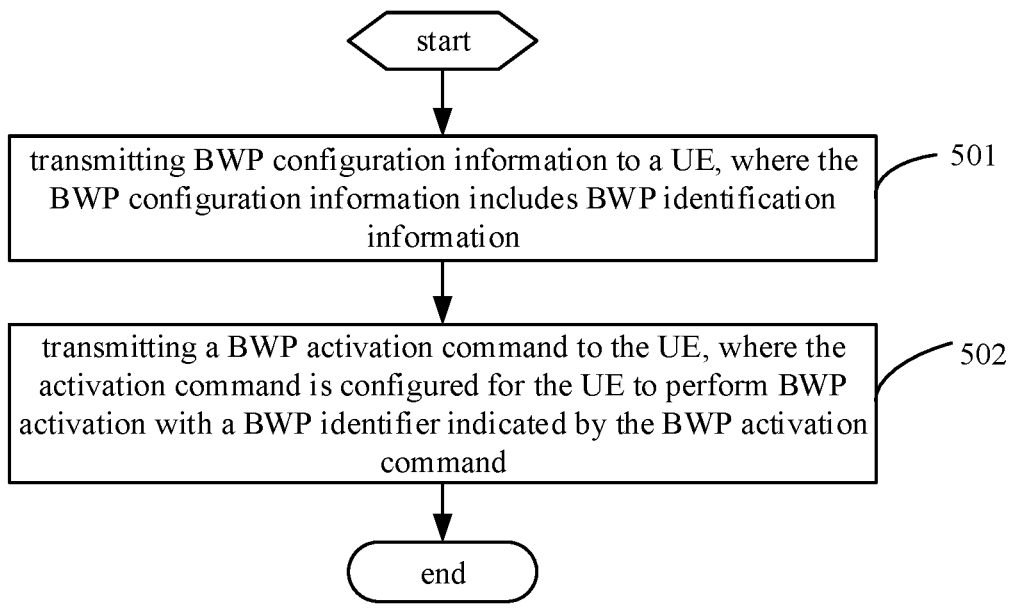
FIG. 5 is a flowchart of a method for controlling activation of a BWP according to another embodiment of the present disclosure.

Reference is made to FIG. 5, and the present disclosure further provides a method for controlling activation of a bandwidth part (BWP), which includes steps 501 and 502.

Step 501 includes: transmitting BWP configuration information to a UE, where the BWP configuration information includes BWP identification information.

The method for controlling activation of a BWP provided by embodiments of the present disclosure is applied in a base station to control an activated state of BWP(s) corresponding to each component carrier.

In this step, the base station first configures a BWP for a UE to access the base station. When configuring the BWP, the base station transmits the BWP configuration information to the UE, and the UE may receive and save the BWP configuration information, thereby saving a correspondence between each component carrier and a default BWP. Specifically, in a practical application, each component carrier is configured with a BWP set, and information about one or more BWPs is stored in the BWP set, that is, one component carrier may correspond to one or more BWPs. In an embodiment, all the BWPs may be numbered.

The BWP identification information may be configured to a UE in an explicit or implicit manner.

The explicit manner includes that a dedicated information bit string is configured in the configuration information for each BWP to indicate index information of the BWP.

The implicit manner includes that a serial number of each BWP in a BWP list of the configuration information is an index of the BWP. As an example, the first BWP in the list is numbered as 0, and BWPs subsequent to the first BWP are respectively numbered as 1, 2, 3, and so on.

Step 502 includes: transmitting a BWP activation command to the UE, where the activation command is configured for the UE to perform BWP activation with a BWP identifier indicated by the BWP activation command.

The base station may transmit a BWP activation command to the UE through L1 signaling or L2 signaling, and the BWP activation command may indicate index information of to-be-activated BWP(s) in an explicit or implicit manner.

The explicit manner includes: carrying index information of a target and to-be-activated BWP in an activation signaling.

The implicit manner includes: carrying a bitmap in an activation signaling, each bit corresponding to one BWP, indicating to activate the BWP when the corresponding bit takes a first value; and indicating to deactivate the BWP when the corresponding bit takes a second value. A position where each indication bit is located in the bitmap corresponds to an index of a corresponding BWP. As an example, the first bit in the bitmap corresponds to a BWP numbered as 0, the second bit in the bitmap corresponds to a BWP numbered as 1, and so on. In a case that a BWP is in an activated state, no operation is performed when a bit corresponding to the BWP in the received activation signaling takes a first value. Similarly, in a case that a BWP is in a deactivated state, no operation is performed when a bit corresponding to the BWP in the received activation signaling takes a second value.

When receiving the BWP activation command, a UE may perform BWP activation with the BWP identifier indicated by the BWP activation command, thereby implementing a control of BWP activation.

Thus, in the embodiment of the present disclosure, BWP configuration information transmitted by a base station is received and saved, where the BWP configuration information includes BWP identification information; a BWP activation command transmitted by the base station is received; and BWP activation is performed based on a BWP identifier indicated by the BWP activation command. BWPs are numbered, the activation command indicates a BWP that needs to be activated, and the BWP is activated by a UE, thereby improving the flexibility of BWP activation control.

Further, the BWP configuration information is used to indicate a default BWP corresponding to each component carrier. After transmitting the BWP configuration information to the user equipment, the method further includes: transmitting a component carrier activation signaling to the user equipment, where the component carrier activation signaling is used for the user equipment to activate a first target component carrier and a default BWP corresponding to the first target component carrier.

When a component carrier is activated, data can be normally transmitted and received on the component carrier only when there is an activated BWP on the component carrier. The above-mentioned default BWP refers to a BWP that needs to be activated by default when a command indicates to activate a BWP, but the command does not indicate that other BWPs on the component carrier require to be activated. The number of the default BWPs corresponding to each component carrier may be set according to actual demands, and may be one or more, which is not specifically limited herein.

It should be appreciated that when a target component carrier is in a deactivated state, all BWPs on the target component carrier are in a deactivated state. In this step, the base station may transmit a component carrier activation signaling to the base station by an MAC CE. The component carrier activation signaling carries a first target component carrier that needs to be activated, and all BWPs on the first target component carrier are in a deactivated state.

After receiving the component carrier activation signaling, the UE obtains the first target component carrier that needs to be activated, which is indicated by the component carrier activation signaling, then obtains a default BWP corresponding to the first target component carrier according to the previously stored BWP configuration information, and finally activates the first target component carrier and the default BWP(s) corresponding to the first target component carrier.

In this embodiment, a default BWP corresponding to each component carrier is configured in BWP configuration information, and then a first target component carrier and a default BWP corresponding to a first target component carrier are directly activated in accordance with the component carrier activation signaling. Therefore, an activated state of the component carrier and an activated state of a BWP on the component carrier can be controlled through a single signaling, thereby reducing signaling overhead. In addition, since a single signaling is used to activate a component carrier and activate a BWP on the component carrier at a same time, a transmission delay can be avoided, which is caused by controlling an activated state of the component carrier and an activated state of the BWP on the component carrier through separate signalings.

It should be appreciated that a manner where a base station configures BWP configuration information for indicating a default BWP corresponding to each component carrier can be set according to actual needs. For example, in an embodiment, the configuring manner can be implemented in any of the following manners:

a first manner including that, for a component carrier configured with a BWP set, one bit is used to indicate whether each BWP in the BWP set is the default BWP;

a second manner including that, for a component carrier configured with a BWP set, a BWP ranked first or last in the BWP set is the default BWP;

a third manner including that, for a component carrier configured with a BWP set, each BWP has an index value, and a BWP with an initial index value in the BWP set is the default BWP; for example, if the BWP identifier value in a BWP set starts from 0, a BWP with the index value 0 is determined as a default BWP;

for a component carrier configured with a BWP set, a BWP with a maximum bandwidth or a minimum bandwidth in the BWP set is the default BWP; or for a component carrier configured with a BWP set, a BWP with a maximum starting frequency or a minimum starting frequency in the BWP set is the default BWP.

Further, after the base station transmits the BWP configuration information, the activated BWP may be deactivated through signaling. Specifically, subsequent to the above step 501, the method further includes: transmitting a BWP deactivation command to the user equipment. The BWP deactivation command is configured to instruct the user equipment to adjust an activated BWP on a second target component carrier to a deactivated state; and the BWP deactivation command is configured to instruct the user equipment to deactivate the second target component carrier, or deactivate the second target component carrier and a corresponding BWP on the second target component carrier, in a case that the activated BWP to be adjusted is a last activated BWP on the second target component carrier.

In this step, the base station may transmit a BWP deactivation command to a UE through L1 or L2 signaling, which may include a BWP that needs to be deactivated. The UE may obtain the second target component carrier where the BWP needs to be deactivated is located, by inquiring previously saved BWP configuration information.

In an embodiment, when a UE performs deactivation on a BWP on the second target component carrier, in a case that there are multiple activated BWPs on the second target component carrier, the UE may directly deactivate a BWP specified in the BWP deactivation command; and in a case that only the last activated BWP exists on the second target component carrier, the UE may deactivate the second target component carrier, or both the second target component carrier and a corresponding BWP (that is, a BWP specified in the deactivation signaling) on the second target component carrier. Since the deactivation of a component carrier can be achieved by only indicating a BWP deactivation during a deactivation process, the signaling overhead is further reduced.

Further, after the base station transmits the BWP configuration information, the activated BWP may be deactivated through signaling. Specifically, subsequent to the above step 501, the method further includes: transmitting a component carrier deactivation signaling to the user equipment. The component carrier deactivation signaling is configured to instruct the user equipment to deactivate a third target component carrier, or to instruct the user equipment to deactivate a third target component carrier and all activated BWPs on the third target component carrier.

In this step, the base station may transmit a component carrier deactivation signaling to a UE through a control element of a medium access control layer (MAC CE). The component carrier deactivation signaling includes a third target component carrier that needs to be deactivated. The UE may obtain all BWPs on the third target component carrier based on the previously saved BWP configuration information. The third target component carrier may include one or more BWPs in an activated state, and may also include one or more BWPs in a deactivated state.

In this embodiment, upon receiving the component carrier deactivation signaling, a UE may deactivate the third target component carrier, or may deactivate the third target component carrier and all the activated BWPs on the third target component carrier. Since the deactivation of a BWP can be achieved only based on a component carrier deactivation signaling, the signaling overhead is further reduced.

Further, the BWP activation command is configured to adjust a deactivated BWP on a fourth target component carrier to an activated state; and the user equipment activates the fourth target component carrier and a BWP designated to be activated through the BWP activation command, in a case that the fourth target component carrier is in an inactive state.

In this step, the base station may transmit a BWP activation command to a UE through L1 signaling or L2 signaling, and the BWP activation command includes a BWP that needs to be activated. The UE may obtain the fourth target component carrier corresponding to the BWP(s) that needs to be activated by inquiring the previously saved BWP configuration information.

The UE determines whether the fourth target component carrier is in an activated state, may directly activate a BWP designated to be activated through the BWP activation command if the fourth target component carrier is currently in an activated state, and may activate the fourth target component carrier and a BWP designated to be activated through the BWP activation command if the fourth target component carrier is currently in a deactivated state. In this embodiment, a component carrier can be controlled to be activated only through a BWP activation command, thereby further reducing the signaling overhead.

It should be noted that in the related art, a UE usually accesses to only one base station, and of course, a UE can also access to two base stations, where one of the base stations is a primary base station and the other one is a secondary base station. In an embodiment, the foregoing BWP configuration information may include BWP configuration information of the primary base station and BWP configuration information of the secondary base station. In a case that a secondary base station needs to be added to the UE, the primary base station configures BWP configuration information of the secondary base station for the UE. The BWP configuration information of the secondary base station is used to indicate a component carrier where a primary cell of the secondary base station is located, and default BWP information corresponding to each component carrier.

In an embodiment, after receiving the BWP configuration information of the secondary base station, the UE may activate the default BWP corresponding to the component carrier where the primary cell of the secondary base station is located based on an indication, thereby implementing data transmission of the secondary base station. It should be understood that, for processes of activating and deactivating a BWP corresponding to a component carrier where a secondary cell in the secondary base station is located, and a non-default BWP corresponding to a component carrier where a primary cell in the secondary base station is located, reference can be made to the foregoing embodiments, and details are not described herein again.

Further, the base station may also perform handover on the primary cell. Specifically, subsequent to the above step 101, the method further includes: transmitting a primary cell handover command to the user equipment, where the primary cell handover command is configured to indicate a target primary cell as a handover cell and a default BWP on the target primary cell.

In this embodiment, a base station can control a UE to be switched to a target primary cell through a primary cell handover command, so as to supply a better service to the UE. In order to enable normal data transmission on the target primary cell, a default BWP on the target primary cell is indicated in the primary cell handover command. Therefore, the UE can complete the subsequent target cell handover procedure on the default BWP.

Figure 6:
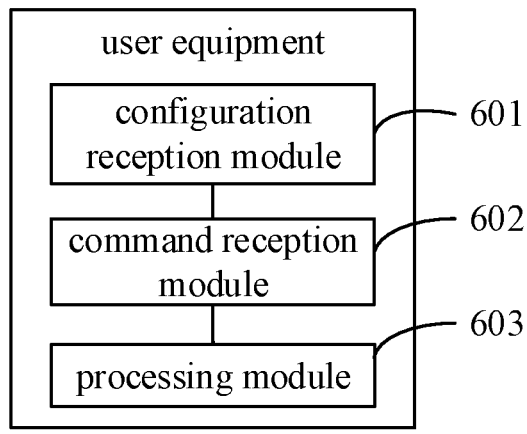
FIG. 6 is a schematic structural diagram of a user equipment according to an embodiment of the present disclosure.

Reference is made to FIG. 6, which is a schematic structural diagram of a UE according to an embodiment of the present disclosure, which can implement details of the method for controlling activation of a bandwidth part (BWP) in the foregoing embodiments, and can achieve the same effects. As shown in FIG. 6, the UE includes:

a configuration reception module 601, configured to receive and save BWP configuration information transmitted by a base station, where the BWP configuration information includes BWP identification information;

a command reception module 602, configured to receive a BWP activation command transmitted by the base station; and a processing module 603, configured to perform BWP activation with a BWP identifier indicated by the BWP activation command.

Optionally, the BWP configuration information is used to indicate a default BWP corresponding to each component carrier. The command reception module 602 is further configured to receive a component carrier activation signaling transmitted by the base station. The processing module 603 is further configured to activate, based on the component carrier activation signaling, a first target component carrier and a default BWP corresponding to the first target component carrier.

Optionally, a manner where the BWP configuration information indicates the default BWP corresponding to each component carrier includes any of the following manners:

a manner in which, for a component carrier configured with a BWP set, one bit is used to indicate whether each BWP in the BWP set is the default BWP;

a manner in which, for a component carrier configured with a BWP set, a BWP ranked first or last in the BWP set is the default BWP;

a manner in which, for a component carrier configured with a BWP set, each BWP has an index value, and a BWP with an initial index value in the BWP set is the default BWP;

a manner in which, for a component carrier configured with a BWP set, a BWP with a maximum bandwidth or a minimum bandwidth in the BWP set is the default BWP; or a manner in which, for a component carrier configured with a BWP set, a BWP with a maximum starting frequency or a minimum starting frequency in the BWP set is the default BWP.

Optionally, the command reception module 602 is further configured to receive a BWP deactivation command transmitted by the base station, and the BWP deactivation command is configured to adjust an activated BWP on a second target component carrier to a deactivated state. The processing module 603 is further configured to deactivate the second target component carrier, or deactivate the second target component carrier and a corresponding BWP on the second target component carrier, in a case that the activated BWP to be adjusted is a last activated BWP on the second target component carrier.

Optionally, the command reception module 602 is further configured to receive a component carrier deactivation signaling transmitted by the base station. The processing module 603 is further configured to deactivate, based on the component carrier deactivation signaling, a third target component carrier, or a third target component carrier and all activated BWPs on the third target component carrier.

Optionally, the BWP activation command is configured to adjust a deactivated BWP on a fourth target component carrier to an activated state. The processing module 603 is further configured to activate the fourth target component carrier and a BWP designated to be activated through the BWP activation command, in a case that the fourth target component carrier is in an inactive state.

Optionally, the command reception module 602 is further configured to: receive BWP configuration information of a secondary base station, and the BWP configuration information of the secondary base station is used to indicate a component carrier where a primary cell of the secondary base station is located, and default BWP information corresponding to each component carrier. The processing module 603 is further configured to activate a default BWP corresponding to the component carrier where the primary cell of the secondary base station is located.

Optionally, the command reception module 602 is further configured to receive a primary cell handover command transmitted by the base station, and the primary cell handover command is configured to indicate a target primary cell as a handover cell and a default BWP on the target primary cell. The processing module 603 is further configured to perform a cell handover based on the default BWP on the target primary cell and the target primary cell.

Thus, in the embodiments of the present disclosure, BWP configuration information transmitted by a base station is received and saved, where the BWP configuration information includes BWP identification information; a BWP activation command transmitted by the base station is received; and a BWP is activated based on a BWP identifier indicated by the BWP activation command. BWPs are numbered, the activation command indicates a BWP that needs to be activated, and the BWP is activated by a UE, thereby improving the flexibility of BWP activation control.

Figure 7:
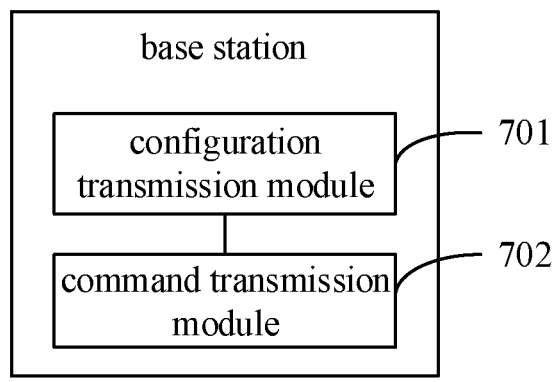
FIG. 7 is a schematic structural diagram of a base station according to an embodiment of the present disclosure.

Referring to FIG. 7, FIG. 7 is a schematic structural diagram of a base station according to an embodiment of the present disclosure, which can implement details of the method for controlling activation of a bandwidth part (BWP) in the foregoing embodiments, and can achieve the same effects. As shown in FIG. 7, the base station includes:

a configuration transmission module 701, configured to transmit BWP configuration information to a user equipment, where the BWP configuration information includes BWP identification information; and a command transmission module 702, configured to transmit a BWP activation command to the user equipment, where the BWP activation command is configured for the user equipment to perform BWP activation with a BWP identifier indicated by the BWP activation command.

Optionally, the BWP configuration information is used to indicate a default BWP corresponding to each component carrier. The command transmission module is further configured to transmit a component carrier activation signaling to the user equipment, where the component carrier activation signaling is used for the user equipment to activate a first target component carrier and a default BWP corresponding to the first target component carrier.

Optionally, the BWP configuration information indicates a default BWP corresponding to each component carrier as follows:

for a component carrier configured with a BWP set, one bit is used to indicate whether each BWP in the BWP set is the default BWP;

for a component carrier configured with a BWP set, a BWP ranked first or last in the BWP set is the default BWP;

for a component carrier configured with a BWP set, each BWP has an index value, and a BWP with an initial index value in the BWP set is the default BWP;

for a component carrier configured with a BWP set, a BWP with a maximum or minimum bandwidth in the BWP set is the default BWP; or for a component carrier configured with a BWP set, a BWP with a maximum or minimum starting frequency in the BWP set is the default BWP.

Optionally, the command transmission module 702 is further configured to transmit a BWP deactivation command to the user equipment. The BWP deactivation command is configured to instruct the user equipment to adjust an activated BWP on a second target component carrier to a deactivated state; and the BWP deactivation command is configured to instruct the user equipment to deactivate the second target component carrier, or to deactivate the second target component carrier and a corresponding BWP on the second target component carrier, in a case that the activated BWP to be adjusted is a last activated BWP on the second target component carrier.

Optionally, the command transmission module 702 is further configured to transmit a component carrier deactivation signaling to the user equipment, and the component carrier deactivation signaling is configured to instruct the user equipment to deactivate a third target component carrier, or to deactivate a third target component carrier and all activated BWPs on the third target component carrier.

Optionally, the BWP activation command is configured to adjust a deactivated BWP on a fourth target component carrier to an activated state; and the BWP activation command is configured to instruct the user equipment to activate the fourth target component carrier and a BWP designated to be activated through the BWP activation command, in a case that the fourth target component carrier is in an inactive state.

Optionally, the BWP configuration information includes BWP configuration information of a primary base station and BWP configuration information of a secondary base station; and the BWP configuration information of the secondary base station is used to indicate a component carrier where a primary cell of the secondary base station is located, and default BWP information corresponding to each component carrier.

Optionally, the command transmission module 702 is further configured to transmit a primary cell handover command to the user equipment, and the primary cell handover command is configured to indicate a target primary cell as a handover cell and a default BWP on the target primary cell.

In view of the above, in the embodiments of the present disclosure, BWP configuration information transmitted by a base station is received and saved, where the BWP configuration information includes BWP identification information; a BWP activation command transmitted by the base station is received; and a BWP is activated based on a BWP identifier indicated by the BWP activation command. BWPs are numbered, the activation command indicates a BWP that needs to be activated, and the BWP is activated by a UE, thereby improving the flexibility of BWP activation control.

Figure 8:
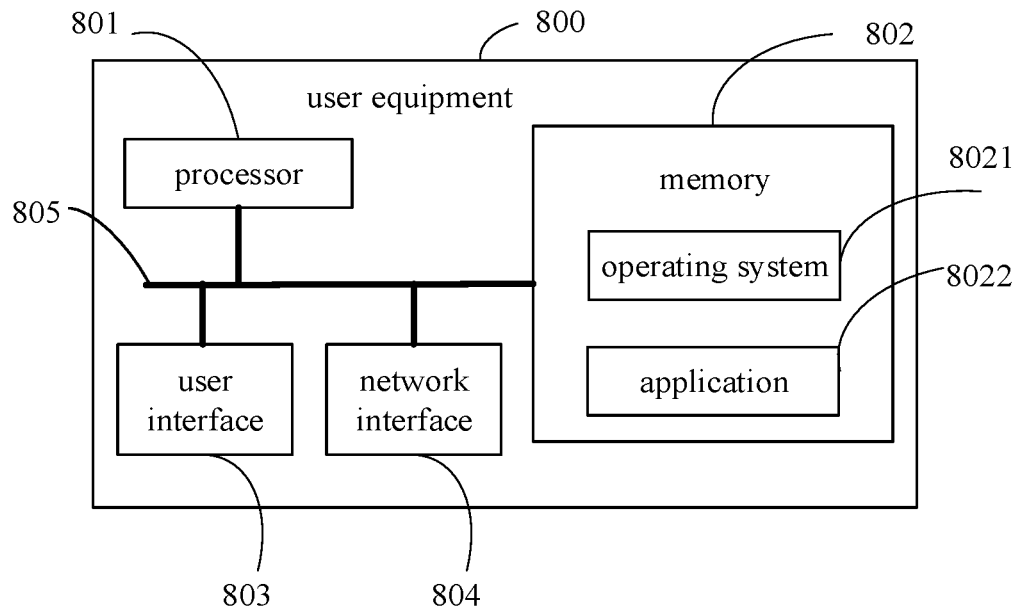
FIG. 8 is a schematic structural diagram of an electronic device according to an embodiment of the present disclosure.

Reference is made to FIG. 8, which is a schematic structural diagram of a UE according to an embodiment of the present disclosure, which can implement details of the method for controlling activation of a bandwidth part (BWP) in the foregoing embodiments, and can achieve the same effects. As shown in FIG. 8, the UE 800 includes: at least one processor 801, a memory 802, at least one network interface 804, and a user interface 803. Various modules in the UE 800 are coupled together through a bus system 805. It is understandable that the bus system 805 is configured to implement connections and communications between these components. The bus system 805 includes a power bus, a control bus, and a signal status bus in addition to a data bus. However, for the sake of clarity, various buses are denoted by the bus system 805 in FIG. 13.

The user interface 803 may include a display, a keyboard, or a click device (for example, a mouse, a track ball, a touch pad, or a touch screen).

It can be understood that the memory 802 in the embodiments of the present disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile storage may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 802 of the system and method described in this specification is meant to include, without limitation, these and any other suitable types of memories.

In some implementations, the memory 802 stores the following elements, an executable module or a data structure, or a subset or extension set thereof, such as an operating system 8021 and an application 8022.

The operating system 8021 includes various system programs, such as a framework layer program, a core library layer program and a driver layer program, to implement various fundamental services and process hardware-based tasks. The application 8022 includes various applications, such as a media player and a browser, to implement a variety of application services. The program implementing the method according to embodiments of the present disclosure may be included in the application 8022.

In an embodiment of the present disclosure, the UE further includes a computer program stored in the memory 802 and executable on the processor 801, which may be specifically the computer program in the application 8022. The computer program is executed by the processor 801 to implement the following steps:

receiving and saving BWP configuration information transmitted by a base station, where the BWP configuration information includes BWP identification information;

receiving a BWP activation command transmitted by the base station; and performing BWP activation with a BWP identifier indicated by the BWP activation command.

The methods disclosed in the foregoing embodiments of the present disclosure may be applied in the processor 801 or implemented by the processor 801. The processor 801 may be an integrated circuit chip with signal processing capabilities. During an implementation process, steps of the methods may be realized in form of hardware by integrated logical circuits in the processor 801, or in form of software by instructions. The processor 801 may be a general purpose processor, a digital signal processor (DSP), an application specific integrated circuit (ASIC), a field programmable gate array (FPGA) or other programmable logic devices, a discrete gate or a transistor logic component, a discrete hardware transistor logic component, discrete hardware assembly, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the memory 802. The processor 801 reads information from the memory 802 and performs the steps of the methods in combination with its hardware.

It is understood that, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in this specification or a combination thereof.

For software implementation, the technical solutions described in the embodiments of the present disclosure may be implemented by a module (e.g., process, or function, etc.) configured to perform the functions described in the embodiments of the present disclosure. Software codes may be stored in a memory and executed by the processor. The memory may be implemented internal or external to the processor.

Optionally, the BWP configuration information is used to indicate a default BWP corresponding to each component carrier, and the computer program is executed by the processor 801 to further implement the following steps:

receiving a component carrier activation signaling transmitted by the base station; and activating, based on the component carrier activation signaling, a first target component carrier and a default BWP corresponding to the first target component carrier.

Optionally, a manner where the BWP configuration information indicates the default BWP corresponding to each component carrier includes any of the following manners:

for a component carrier configured with a BWP set, one bit is used to indicate whether each BWP in the BWP set is the default BWP;

for a component carrier configured with a BWP set, a BWP ranked first or last in the BWP set is the default BWP;

for a component carrier configured with a BWP set, each BWP has an index value, and a BWP with an initial index value in the BWP set is the default BWP;

for a component carrier configured with a BWP set, a BWP with a maximum bandwidth or a minimum bandwidth in the BWP set is the default BWP; or for a component carrier configured with a BWP set, a BWP with a maximum starting frequency or a minimum starting frequency in the BWP set is the default BWP.

Optionally, the computer program is executed by the processor 801 to further implement the following steps:

receiving a BWP deactivation command transmitted by the base station, where the BWP deactivation command is configured to adjust an activated BWP on a second target component carrier to a deactivated state; and deactivating the second target component carrier, or deactivating the second target component carrier and a corresponding BWP on the second target component carrier, in a case that the activated BWP to be adjusted on the second target component carrier is a last activated BWP.

Optionally, the computer program is executed by the processor 801 to further implement the following steps:

receiving a component carrier deactivation signaling transmitted by the base station; and deactivating, based on the component carrier deactivation signaling, a third target component carrier, or a third target component carrier and all activated BWPs on the third target component carrier.

Optionally, the BWP activation command is configured to adjust a deactivated BWP on a fourth target component carrier to an activated state; and the fourth target component carrier and a BWP designated to be activated through the BWP activation command is activated, in a case that the fourth target component carrier is in an inactive state.

Optionally, the BWP configuration information includes BWP configuration information of a primary base station and BWP configuration information of a secondary base station; and when the BWP configuration information of the secondary base station is received, the BWP configuration information of the secondary base station is used to indicate a component carrier where a primary cell of the secondary base station is located, and default BWP information corresponding to each component carrier. The computer program is executed by the processor 801 to further implement the following steps: activating a default BWP corresponding to the component carrier where the primary cell of the secondary base station is located.

Optionally, the computer program is executed by the processor 801 to further implement the following steps:

receiving a primary cell handover command transmitted by the base station, where the primary cell handover command is configured to indicate a target primary cell as a handover cell and a default BWP on the target primary cell; and performing a cell handover based on the default BWP on the target primary cell and the target primary cell.

In view of the above, in the embodiments of the present disclosure, BWP configuration information transmitted by a base station is received and saved, where the BWP configuration information includes BWP identification information; a BWP activation command transmitted by the base station is received; and a BWP is activated based on a BWP identifier indicated by the BWP activation command. BWPs are numbered, the activation command indicates a BWP that needs to be activated, and the BWP is activated by a UE, thereby improving the flexibility of BWP activation control.

Figure 9:
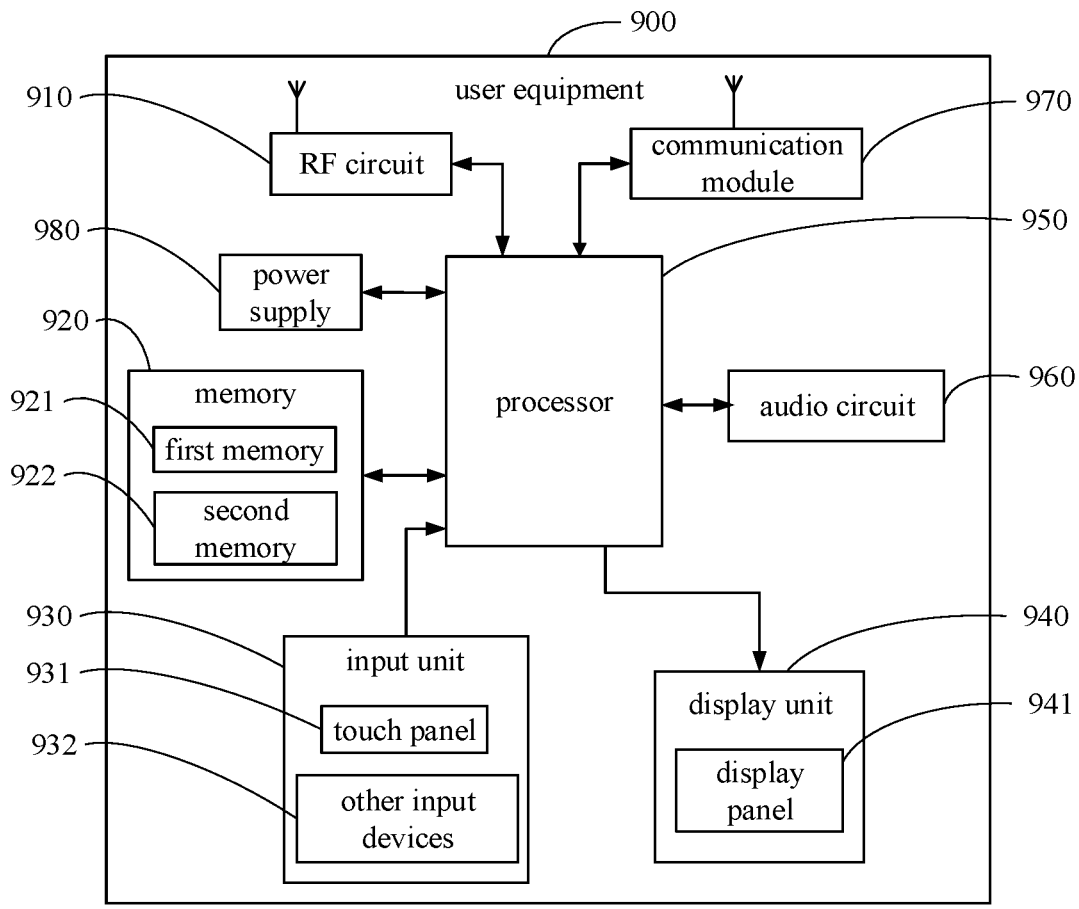
FIG. 9 is a schematic structural diagram of an electronic device according to another embodiment of the present disclosure.

Referring to FIG. 9, FIG. 9 is a structural diagram of a UE according to an embodiment of the present disclosure, which can implement details of the method for controlling activation of a bandwidth part (BWP) in the foregoing embodiments, and can achieve the same effects. As shown in FIG. 9, the UE 900 includes a radio frequency (RF) circuit 910, a memory 920, an input unit 930, a display unit 940, a processor 950, an audio circuit 960, a communication module 970, and a power supply 980, and further includes a camera (not shown).

The input unit 930 may be configured to receive numeric or character information inputted by a user, and to generate signal inputs related to user settings and function control of the UE 900. Specifically, in an embodiment of the present disclosure, the input unit 930 may include a touch panel 931. The touch panel 931, also referred to as a touch screen, may collect touch operations by the user on or near the touch panel (such as an operation performed by the user using any suitable object or accessory such as a finger or a stylus on the touch panel 931), and drive a corresponding connection apparatus according to a predetermined program. Optionally, the touch panel 931 may include two parts: a touch detection apparatus and a touch controller. The touch detection apparatus is configured to detect a touch position of the user, detect a signal generated due to the touch operation, and transmit the signal to the touch controller; and the touch controller is configured to receive the touch information from the touch detection device, convert the touch information into contact coordinates, send the contact coordinates to the processor 950, and receive and execute commands from the processor 950. In addition, the touch panel 931 may be implemented in various types such as resistive, capacitive, infrared, and surface acoustic waves. In addition to the touch panel 931, the input unit 930 may further include other input devices 932. The input devices 932 may include, but not limited to, one or more of a physical keyboard, a function button (such as a volume control button and a switch buttons), a trackball, a mouse, or a joystick.

The display unit 940 may be configured to display information inputted by the user or information provided to the user and various menu interfaces of the UE 900. The display unit 940 may include a display panel 941. Optionally, the display panel 941 may be configured in the form of a liquid crystal display (LCD) panel or an organic light-emitting diode (OLED).

It should be noted that the touch panel 931 may cover the display panel 941 to form a touch display screen, and when the touch display screen detects a touch operation on or near it, the touch operation is transmitted to the processor 950 to determine the type of the touch event, and then the processor 950 provides a corresponding visual output on the touch display screen based on the type of touch event.

The processor 950 is the control center of the UE 900, which connects various parts of the entire mobile phone by using various interfaces and wirings, performs functions of the UE 900 and process data by running or executing software programs and/or modules stored in a first memory 921 and invoking data stored in a second memory 922, thereby performing overall monitoring on the UE 900. Optionally, the processor 950 may include one or more processing units.

In an embodiment of the present disclosure, by calling a software program and/or a module stored in the first memory 921, and/or data stored in the second memory 922, the computer program is executed by the processor 950 to perform the following steps:
  receiving and saving BWP configuration information transmitted by a base station, where the BWP configuration information includes BWP identification information;
  receiving a BWP activation command transmitted by the base station; and
  performing BWP activation with a BWP identifier indicated by the BWP activation command.

Optionally, the BWP configuration information is used to indicate a default BWP corresponding to each component carrier; and the computer program is executed by the processor 950 to further perform the following steps:
  receiving a component carrier activation signaling transmitted by the base station; and
  activating, based on the component carrier activation signaling, a first target component carrier and a default BWP corresponding to the first target component carrier.

Optionally, a manner where the BWP configuration information indicates the default BWP corresponding to each component carrier includes any of the following manners:
  for a component carrier configured with a BWP set, one bit is used to indicate whether each BWP in the BWP set is the default BWP;
  for a component carrier configured with a BWP set, a BWP ranked first or last in the BWP set is the default BWP;
  for a component carrier configured with a BWP set, each BWP has an index value, and a BWP with an initial index value in the BWP set is the default BWP;
  for a component carrier configured with a BWP set, a BWP with a maximum bandwidth or a minimum bandwidth in the BWP set is the default BWP; or
  for a component carrier configured with a BWP set, a BWP with a maximum starting frequency or a minimum starting frequency in the BWP set is the default BWP.

Optionally, the computer program is executed by the processor 950 to further perform the following steps:
  receiving a BWP deactivation command transmitted by the base station, where the BWP deactivation command is configured to adjust an activated BWP on a second target component carrier to a deactivated state; and
  deactivating the second target component carrier, or deactivating the second target component carrier and a corresponding BWP on the second target component carrier, in a case that the activated BWP to be adjusted on the second target component carrier is a last activated BWP.

Optionally, the computer program is executed by the processor 950 to further perform the following steps:
  receiving a component carrier deactivation signaling transmitted by the base station; and
  deactivating, based on the component carrier deactivation signaling, a third target component carrier, or a third target component carrier and all activated BWPs on the third target component carrier.

Optionally, the BWP activation command is configured to adjust a deactivated BWP on a fourth target component carrier to an activated state; and the fourth target component carrier and a BWP designated to be activated through the BWP activation command is activated, in a case that the fourth target component carrier is in an inactive state.

Optionally, the BWP configuration information includes BWP configuration information of a primary base station and BWP configuration information of a secondary base station; and when the BWP configuration information of the secondary base station is received, the BWP configuration information of the secondary base station is used to indicate a component carrier where a primary cell of the secondary base station is located, and default BWP information corresponding to each component carrier. The computer program is executed by the processor 950 to further perform the following steps:
  activating a default BWP corresponding to the component carrier where the primary cell of the secondary base station is located.

Optionally, the computer program is executed by the processor 950 to further perform the following steps:
  receiving a primary cell handover command transmitted by the base station, where the primary cell handover command is configured to indicate a target primary cell as a handover cell and a default BWP on the target primary cell; and
  performing a cell handover based on the default BWP on the target primary cell and the target primary cell.

In view of the above, in the embodiments of the present disclosure, BWP configuration information transmitted by a base station is received and saved, where the BWP configuration information includes BWP identification information; a BWP activation command transmitted by the base station is received; and a BWP is activated based on a BWP identifier indicated by the BWP activation command. BWPs are numbered, the activation command indicates a BWP that needs to be activated, and the BWP is activated by a UE, thereby improving the flexibility of BWP activation control.

Figure 10:
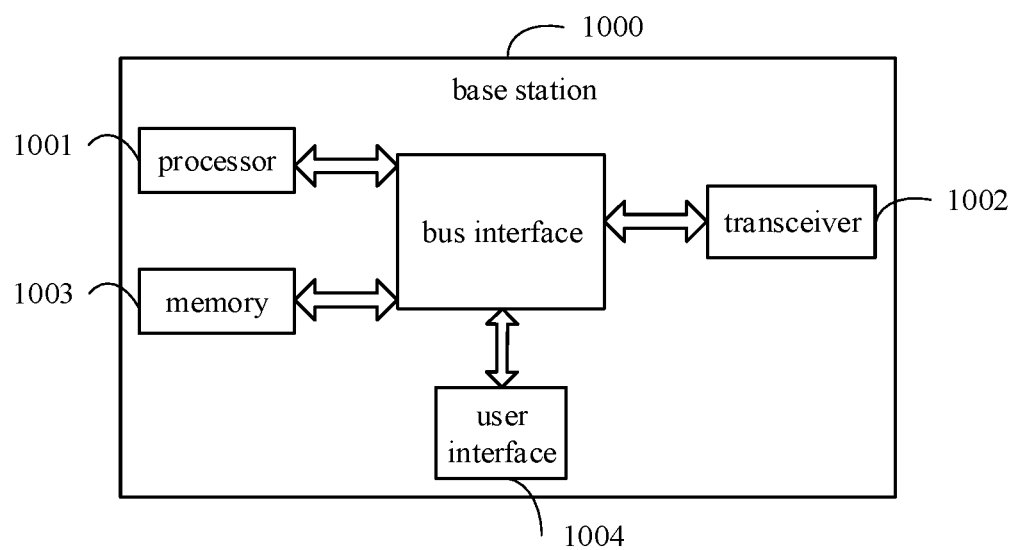
FIG. 10 is a schematic structural diagram of a base station according to another embodiment of the present disclosure.

Referring to FIG. 10, FIG. 10 is a schematic structural diagram of a base station according to an embodiment of the present disclosure, which can implement details of the method for controlling activation of a bandwidth part (BWP) in the foregoing embodiments, and can achieve the same effects. As shown in FIG. 10, the base station 1000 includes: a processor 1001, a transceiver 1002, a memory 1003, a user interface 1004, and a bus interface. The processor 1001 is configured to read a program in the memory 1003 and execute the following processes:
  transmitting BWP configuration information to a user equipment, where the BWP configuration information includes BWP index information; and
  transmitting a BWP activation command to the user equipment, where the BWP activation-related command is configured for the user equipment to perform BWP activation with a BWP index indicated by the BWP activation-related command.

In FIG. 10, a bus architecture may include any number of interconnected buses and bridges, and may be specifically configured to couple various circuits including one or more processors represented by the processor 1001 and storages represented by the memory 1003. The bus architecture may also couple various other circuits such as peripherals, voltage regulators and power management circuits, which are well known in the art. Therefore, a detailed description thereof is omitted herein. A bus interface provides an interface. The transceiver 1002 may be multiple elements, i.e., including a transmitter and a receiver, to allow for communication with various other apparatuses on the transmission medium. For different user equipment, the user interface 1004 may also be an interface capable of may also be an interface capable of externally or internally connecting the required devices, which includes, but not limited to, a keypad, a display, a speaker, a microphone, a joystick, and the like.

The processor 1001 is responsible for the control of the bus architecture and general processing, and the memory 1003 may store data used by the processor 300 in performing operations.

Optionally, the BWP configuration information is used to indicate a default BWP corresponding to each component carrier; and the program is executed by the processor 1001 to further perform the following steps:

transmitting a component carrier activation-related signaling to the user equipment, where the component carrier activation-related signaling is used for the user equipment to activate a first target component carrier and a default BWP corresponding to the first target component carrier.

Optionally, the BWP configuration information indicates a default BWP corresponding to each component carrier as follows:

for a component carrier configured with a BWP set, one bit is used to indicate whether each BWP in the BWP set is the default BWP;

for a component carrier configured with a BWP set, a BWP ranked first or last in the BWP set is the default BWP;

for a component carrier configured with a BWP set, each BWP has an identification value, and a BWP with an initial identification value in the BWP set is the default BWP;

for a component carrier configured with a BWP set, a BWP with a maximum or minimum bandwidth in the BWP set is the default BWP; or for a component carrier configured with a BWP set, a BWP with a maximum or minimum starting frequency in the BWP set is the default BWP.

Optionally, the program is executed by the processor 1001 to further perform the following steps:

transmitting a BWP deactivation-related command to the user equipment, where the BWP deactivation-related command is configured to instruct the user equipment to adjust an activated BWP on a second target component carrier to a deactivated state; and the BWP deactivation-related command is configured to instruct the user equipment to deactivate the second target component carrier, or deactivate the second target component carrier and a corresponding BWP on the second target component carrier, in a case that the activated BWP to be adjusted is a last activated BWP on the second target component carrier.

Optionally, the program is executed by the processor 1001 to further perform the following steps:

transmitting a component carrier deactivation-related signaling to the user equipment, where the component carrier deactivation-related signaling is configured to instruct the user equipment to deactivate a third target component carrier, or to deactivate a third target component carrier and all activated BWPs on the third target component carrier.

Optionally, the BWP activation-related command is configured to adjust a deactivated BWP on a fourth target component carrier to an activated state; and the BWP activation-related command is configured to instruct the user equipment to activate the fourth target component carrier and a BWP designated to be activated through the BWP activation-related command, in a case that the fourth target component carrier is in an inactive state.

Optionally, the BWP configuration information includes BWP configuration information of a primary base station and BWP configuration information of a secondary base station; and the BWP configuration information of the secondary base station is used to indicate a component carrier where a primary cell of the secondary base station is located, and default BWP information corresponding to each component carrier.

Optionally, the program is executed by the processor 1001 to further perform the following steps:

transmitting a primary cell handover command to the user equipment, where the primary cell handover command is configured to indicate a target primary cell as a handover cell and a default BWP on the target primary cell.

In view of the above, in the embodiments of the present disclosure, BWP configuration information transmitted by a base station is received and saved, where the BWP configuration information includes BWP index information; a BWP activation-related command transmitted by the base station is received; and a BWP is activated based on a BWP index indicated by the BWP activation-related command. BWPs are numbered, the activation-related command indicates a BWP that needs to be activated, and the BWP is activated by a UE, thereby improving the flexibility of BWP activation control.

An embodiment of the present disclosure further provides a computer-readable storage medium, having stored a computer program thereon. The computer program is executed by a processor to implements steps in a method for controlling activation of a bandwidth part (BWP) in any one of the foregoing method embodiments.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

The above descriptions are merely specific implementations of the present disclosure, but the scope of the present disclosure is not limited thereto. Any modifications and substitutions easily made by a person of ordinary skill in the art without departing from the technical principle of the present disclosure shall fall within the scope of the present disclosure. Therefore, the scope of the present disclosure shall be determined by the claims.

What is claimed is:

1. A method for controlling activation of a bandwidth part (BWP), comprising:
    receiving BWP configuration information transmitted by a base station;
    wherein the BWP configuration information is used to indicate a default BWP corresponding to each component carrier; and
    after receiving the BWP configuration information transmitted by the base station, the method further comprises:
    receiving a component carrier deactivation signaling transmitted by the base station; and
    deactivating, based on the component carrier deactivation signaling, a third target component carrier and all activated BWPs on the third target component carrier.

2. The method according to claim 1, wherein after receiving the BWP configuration information transmitted by the base station, the method further comprises:
    receiving a component carrier activation signaling transmitted by the base station; and
    activating, based on the component carrier activation signaling, a first target component carrier and a default BWP corresponding to the first target component carrier.

3. The method according to claim 1, wherein a manner where the BWP configuration information indicates the default BWP corresponding to each component carrier comprises any of the following manners:
    a manner in which, for a component carrier configured with a BWP set, one bit is used to indicate whether each BWP in the BWP set is the default BWP;
    a manner in which, for a component carrier configured with a BWP set, a BWP ranked first or last in the BWP set is the default BWP;
    a manner in which, for a component carrier configured with a BWP set, each BWP has an index value, and a BWP with an initial index value in the BWP set is the default BWP;
    a manner in which, for a component carrier configured with a BWP set, a BWP with a maximum bandwidth or a minimum bandwidth in the BWP set is the default BWP; or
    a manner in which, for a component carrier configured with a BWP set, a BWP with a maximum starting frequency or a minimum starting frequency in the BWP set is the default BWP.

4. The method according to claim 1, wherein after receiving the BWP configuration information transmitted by the base station, the method further comprises:
    receiving a BWP deactivation command transmitted by the base station, wherein the BWP deactivation command is configured to adjust an activated BWP on a second target component carrier to a deactivated state; and
    deactivating the second target component carrier, or deactivating the second target component carrier and a corresponding BWP on the second target component carrier, in a case that the activated BWP to be adjusted on the second target component carrier is a last activated BWP.

5. The method according to claim 1, further comprising:
    receiving a BWP activation command transmitted by the base station; and
    performing BWP activation with a BWP identifier indicated by the BWP activation command,
    wherein the BWP activation command is configured to adjust a deactivated BWP on a fourth target component carrier to an activated state; and
    the performing BWP activation with the BWP identifier indicated by the BWP activation command comprises:
    activating the fourth target component carrier and a BWP designated to be activated through the BWP activation command, in a case that the fourth target component carrier is in a deactivated state.

6. The method according to claim 1, wherein the BWP configuration information comprises BWP configuration information of a primary base station and BWP configuration information of a secondary base station;

when the BWP configuration information of the secondary base station is received, the BWP configuration information of the secondary base station is used to indicate a component carrier where a primary cell of the secondary base station is located, and default BWP information corresponding to each component carrier; and after receiving the BWP configuration information transmitted by the base station, the method further comprises:

activating a default BWP corresponding to the component carrier where the primary cell of the secondary base station is located.

7. The method according to claim 1, wherein after receiving the BWP configuration information transmitted by the base station, the method further comprises:

receiving a primary cell handover command transmitted by the base station, wherein the primary cell handover command is configured to indicate a target primary cell for handover and a default BWP on the target primary cell; and performing a cell handover based on the default BWP on the target primary cell and the target primary cell.

8. The method according to claim 1, wherein the BWP configuration information comprises BWP identification information; the method further comprises:

receiving a BWP activation command transmitted by the base station; and performing BWP activation with a BWP identifier indicated by the BWP activation command.

9. A method for controlling activation of a bandwidth part (BWP), comprising:

transmitting BWP configuration information to a user equipment; wherein the BWP configuration information is used to indicate a default BWP corresponding to each component carrier; and wherein after transmitting the BWP configuration information to the user equipment, the method further comprises:

transmitting a component carrier deactivation signaling to the user equipment, wherein the component carrier deactivation signaling is configured to instruct the user equipment to deactivate a third target component carrier and all activated BWPs on the third target component carrier.

10. The method according to claim 9, wherein after transmitting the BWP configuration information to the user equipment, the method further comprises:

transmitting a component carrier activation signaling to the user equipment, wherein the component carrier activation signaling is used for the user equipment to activate a first target component carrier and a default BWP corresponding to the first target component carrier.

11. The method according to claim 9, wherein a manner where the BWP configuration information indicates a default BWP corresponding to each component carrier comprises any of the following manners:

a manner in which, for a component carrier configured with a BWP set, one bit is used to indicate whether each BWP in the BWP set is the default BWP;

a manner in which, for a component carrier configured with a BWP set, a BWP ranked first or last in the BWP set is the default BWP;

a manner in which, for a component carrier configured with a BWP set, each BWP has an index value, and a BWP with an initial index value in the BWP set is the default BWP;

a manner in which, for a component carrier configured with a BWP set, a BWP with a maximum bandwidth or a minimum bandwidth in the BWP set is the default BWP; or a manner in which, for a component carrier configured with a BWP set, a BWP with a maximum starting frequency or a minimum starting frequency in the BWP set is the default BWP.

12. The method according to claim 9, wherein after transmitting the BWP configuration information to the user equipment, the method further comprises:

transmitting a BWP deactivation command to the user equipment, wherein the BWP deactivation command is configured to instruct the user equipment to adjust an activated BWP on a second target component carrier to a deactivated state; and the BWP deactivation command is configured to instruct the user equipment to deactivate the second target component carrier, or deactivate the second target component carrier and a corresponding BWP on the second target component carrier, in a case that the activated BWP to be adjusted is a last activated BWP on the second target component carrier.

13. The method according to claim 9, further comprising: transmitting a BWP activation command to the user equipment, wherein the BWP activation command is configured for the user equipment to perform BWP activation with a BWP identifier indicated by the BWP activation command, wherein the BWP activation command is configured to adjust a deactivated BWP on a fourth target component carrier to an activated state; and the BWP activation command is configured to instruct the user equipment to activate the fourth target component carrier and a BWP designated to be activated through the BWP activation command, in a case that the fourth target component carrier is in a deactivated state.

14. The method according to claim 9, wherein the BWP configuration information comprises BWP configuration information of a primary base station and BWP configuration information of a secondary base station; and the BWP configuration information of the secondary base station is used to indicate a component carrier where a primary cell of the secondary base station is located, and default BWP information corresponding to each component carrier.

15. The method according to claim 9, wherein after transmitting the BWP configuration information to the user equipment, the method further comprises:

transmitting a primary cell handover command to the user equipment, wherein the primary cell handover command is configured to indicate a target primary cell for handover and a default BWP on the target primary cell.

16. The method according to claim 9, wherein the BWP configuration information comprises BWP identification information; the method further comprises:

transmitting a BWP activation command to the user equipment, wherein the BWP activation command is configured for the user equipment to perform BWP activation with a BWP identifier indicated by the BWP activation command.

17. A user equipment, comprising:
one or more processors;
a memory; and
one or more programs, wherein the one or more programs are stored in the memory and configured to be executed by the one or more processors, and when executing the one or more programs, the one or more processors are configured to:
receive bandwidth part (BWP) configuration information transmitted by a base station;
wherein the BWP configuration information is used to indicate a default BWP corresponding to each component carrier; and
the one or more processors are further configured to:
receive a component carrier deactivation signaling transmitted by the base station; and
deactivate, based on the component carrier deactivation signaling, a third target component carrier and all activated BWPs on the third target component carrier.

18. The user equipment according to claim 17, wherein the one or more processors are further configured to:
receive a component carrier activation signaling transmitted by the base station; and activate, based on the component carrier activation signaling, a first target component carrier and a default BWP corresponding to the first target component carrier.

19. The user equipment according to claim 17, wherein the BWP configuration information comprises BWP configuration information of a primary base station and BWP configuration information of a secondary base station;
the one or more processors are further configured to:
receive the BWP configuration information of the secondary base station, and the BWP configuration information of the secondary base station is used to indicate a component carrier where a primary cell of the secondary base station is located, and default BWP information corresponding to each component carrier; and
the one or more processors are further configured to:
activate a default BWP corresponding to the component carrier where the primary cell of the secondary base station is located.

20. The user equipment according to claim 17, wherein the one or more processors are further configured to:
receive a primary cell handover command transmitted by the base station, wherein the primary cell handover command is configured to indicate a target primary cell for handover and a default BWP on the target primary cell; and
perform a cell handover based on the default BWP on the target primary cell and the target primary cell.

* * * * *